US007652757B2

(12) United States Patent
Power et al.

(10) Patent No.: US 7,652,757 B2
(45) Date of Patent: Jan. 26, 2010

(54) METHOD AND APPARATUS FOR INSPECTION OF SECURITY ARTICLES INCORPORATING A DIFFRACTIVE OPTICAL PROJECTION ELEMENT

(75) Inventors: Gary Fairless Power, Greenvale (AU); Patrick Swift, Lancefield (AU); James Hock Hai Chua, Castlecrag (AU); Anthony Nardella, Taylor Lakes (AU); Paul Henson, Craigieburn (AU)

(73) Assignee: Securency International Pty Ltd, Craigieburn, Victoria (AU)

( * ) Notice: Subject to any disclaimer, the term of this patent is extended or adjusted under 35 U.S.C. 154(b) by 200 days.

(21) Appl. No.: 10/585,506

(22) PCT Filed: Jan. 10, 2005

(86) PCT No.: PCT/AU2005/000016

§ 371 (c)(1), (2), (4) Date: May 9, 2007

(87) PCT Pub. No.: WO2005/066902

PCT Pub. Date: Jul. 21, 2005

(65) Prior Publication Data

US 2008/0046199 A1 Feb. 21, 2008

(30) Foreign Application Priority Data

Jan. 9, 2004 (AU) .............................. 2004900118

(51) Int. Cl.
*G06K 9/74* (2006.01)

(52) U.S. Cl. ........................................... 356/71; 359/2

(58) Field of Classification Search .................... 356/71
See application file for complete search history.

(56) References Cited

U.S. PATENT DOCUMENTS 5,886,798 A 3/1999 Staub et al.
6,111,953 A * 8/2000 Walker et al. ................. 380/51
7,123,413 B2 * 10/2006 Dickson et al. ............. 359/566
7,130,119 B2 * 10/2006 Takahashi et al. ........... 359/462

(Continued)

FOREIGN PATENT DOCUMENTS

DE 195 42 995 5/1997

(Continued)

OTHER PUBLICATIONS

Definition of hologram- (2007) The Penguin English Dictionary. London: Penguin. Retrieved Jun. 5, 2009.*

*Primary Examiner*—Tarifur Chowdhury
*Assistant Examiner*—Rebecca C Slomski
(74) *Attorney, Agent, or Firm*—Andrus, Sceales, Starke & Sawall, LLP

(57) ABSTRACT

A method and apparatus for inspection of a security article (10) is provided in which a substantially collimated light beam (15) from a point light source (14) is directed onto a diffractive optical projection element (DOE) (11). The light beam is transformed by the DOE (11) into a patterned beam (17) which is reconstructed to form a projected image at a particular position in space remote from the surface of the security article 910). An optical detection device 916) is located at which the patterned beam (17) is reconstructed to detect the projected image. The inspection method and apparatus may be used in equipment for handling, sorting, counting or otherwise processing security articles, in particular security documents such as banknotes. The apparatus may include a processor for generating a signal when the absence or poor quality of a DOE is detected and which is used to isolate or mark the security article.

8 Claims, 3 Drawing Sheets

U.S. PATENT DOCUMENTS

2001/0054901 A1 12/2001 Puttkammer
2002/0154290 A1* 10/2002 Tompkin et al. .............. 356/71

FOREIGN PATENT DOCUMENTS

DE 199 26 733 12/2000
EP 1 291 199 3/2003
GB 2 311 130 9/1997
WO WO-93/00224 1/1993
WO WO-99/37488 7/1999

* cited by examiner

METHOD AND APPARATUS FOR INSPECTION OF SECURITY ARTICLES INCORPORATING A DIFFRACTIVE OPTICAL PROJECTION ELEMENT

CROSS REFERENCE TO RELATED APPLICATION

The present application is the U.S. national stage application of International Application PCT/AU2005/000016, filed Jan. 10, 2005, which international application was published on Jul. 21, 2005 as International Publication WO 2005/066902. The International Application claims priority of Australian Patent Application 2004900118, filed Jan. 9, 2004.

BACKGROUND OF THE INVENTION

This invention relates to security articles, such as banknotes or other security documents, and is particularly concerned with providing a method and an apparatus for inspecting a security device or devices in one or more security articles.

As used herein, the term “security documents” includes documents and tokens such as identity documents, value documents or entrance documents, which in turn respectively include: passports, visas, identity cards, drivers licences, and security entrance cards, banknotes, shares, bonds, certificates, cheques, lottery tickets, bank cards, charge cards and credit cards, and aeroplane tickets, bus tickets, railroad tickets, and tickets to fun parks or specific rides. These security documents or tokens typically include some form of authenticity verification to guard against copying and fraudulent alteration. It will, however, be appreciated that this invention is applicable to other types of articles which require authentication and/or protection against copying or theft. Such articles, including security documents, are referred to broadly as “security articles” in this specification.

A wide variety of security devices have been proposed for use in security documents for verification of authenticity and to make counterfeiting of the documents difficult. Some types of security devices are low security devices, printed devices or embossings, which are relatively inexpensive to produce in security documents but which only provide a relatively low degree of security. Other types of security devices are high security devices, such as diffraction gratings or holograms. These can provide a higher degree of security because they are more difficult to counterfeit, but are more expensive to produce and so are generally used in higher value security documents, such as $50 or $100 banknotes, when high security devices are provided in banknotes, it is desirable to detect their presence and quality in the production process of the banknotes before the banknotes are issued to the public. It is also desirable to provide apparatus for inspecting a high security device in a single banknote.

WO 99/37488 discloses a security document and method in which a diffractive optical projection element is provided within a transparent portion or window in the document, The diffractive optical projection element transforms a collimated beam of light, e.g. from a point light source or laser, into a patterned beam of a selected design. In the method of verifying the authenticity of the security document described in WO 99/37488, the patterned beam is projected onto a viewing surface, e.g. by folding the security document so that another part of the document laterally spaced from the window acts as the viewing surface. In another embodiment, the security document of WO 99/37488 may include a second transparent portion or window which can act as a pseudo point light source when the security document is folded.

In each embodiment described in WO 99/37488, the authenticity of the security document incorporating the diffractive optical projection element is verified visually by a person viewing the patterned beam when it impinges upon a viewing surface. However, this visual viewing method is not very suitable for inspecting the presence or quality of diffractive optical elements in banknotes or sheets of banknotes in equipment such as printing equipment, note sorting equipment or other equipment used in processing banknotes or the like.

SUMMARY OF THE INVENTION

According to one aspect of the invention, there is provided a method for inspection of at least one security article, wherein the security article incorporates a diffractive optical projection element as a security device, and wherein the method comprises the steps of:

directing a beam of light from a light source onto said diffractive optical projection element which transforms the beam into a patterned beam of light, that is reconstructed at a particular position in space to form a projected image; and detecting the projected image with at least one optical detection device located at a position at which the patterned beam of light is reconstructed to form the projected image.

The “diffractive optical projection element” used in the invention is a diffractive microstructure which comprises an array of cells each designed to transform the phase of a coherent illuminating beam by a specified amount. The diffracted wavefronts transformed by the individual cells form a patterned beam of light and interfere in a particular reconstruction plane remote from the plane of the diffractive optical element thereby forming the projected image in the reconstruction plane. Therefore, the location of the optical detection device substantially in the reconstruction plane of the diffractive optical projection element is important in the present invention. This requires knowledge of the particular diffractive optical projection element to be detected in order to set up the apparatus for inspection.

According to a second aspect of the invention, there is provided an apparatus for inspection of at least one security article incorporating a diffractive optical projection element as a security device, wherein the apparatus comprises:

a light source for directing a beam of light onto said diffractive optical projection element which transforms the beam into a patterned beam of light that is reconstructed at a particular position in space to form a projected image; and at least one optical detection device located at the position at which the patterned beam of light is reconstructed to form the projected image.

The light source is preferably arranged to direct a substantially collimated beam of light onto the diffractive optical projection element. The light source is preferably a point light source, such as a light emitting diode (LED), a halogen light source or a laser (solid state or otherwise). It will, however, be appreciated that other types of point light sources may be used.

The optical detection device is preferably arranged to detect the amplitude of different parts of the patterned light beam forming the projected image. The optical detection device may comprise one or more photodiodes, e.g. an array of photodiodes, or a charge couple device (CCD), such as a line CCD or a matrix CCD.

In one preferred embodiment, the diffractive optical projection element is provided in a substantially transparent or translucent portion or window in a security document, the light source is positioned on one side of the security document and the optical detection device is positioned on the opposite side of the security document. Thus light passes through the diffractive optical projection element and the incident light beam is transformed into the patterned beam on the opposite side of the document and projected onto the optical detection device.

In an alternative embodiment, the diffractive optical projection element may overlie a reflective surface, such as a metallic layer or coating of the security article. In this case, the light source and the detection means may be provided on the same side of the security article with the optical detection device detecting a reflected beam transformed by the diffractive optical projection element into the patterned beam and projected onto the detection means.

In accordance with the invention the apparatus may be incorporated into a wide variety of equipment for printing, sorting, counting, handling or otherwise processing security documents. For example, a light source and associated detection means may be provided for inspecting individual banknotes in a note counter or note sorter. The apparatus may include a plurality of optical detection devices, for instance when a sheet containing a plurality of banknotes each containing diffractive optical projection elements is required to be inspected, e.g. during the printing of a sheet of banknotes.

The apparatus preferably includes a processor for processing signals from the optical detection device.

According to a third aspect of the invention there is provided equipment for sorting, handling or otherwise processing security articles comprising inspection apparatus in accordance with the second aspect of the invention and article processing means for subsequently processing the security articles according to signals from the optical detection device. For example, if the detection device identifies a faulty security article, it may emit a signal rejecting the faulty article so that the article can be marked for rejection and/or rejected from the security article processing equipment.

According to a fourth aspect of the invention, there is provided equipment for sorting, handling, counting or otherwise processing security documents, the equipment including:

a detector for detecting the presence of a security document;

a window locator for locating a window in the security document incorporating a diffractive optical element;

a light source for directing a beam of light through said diffractive optical projection element in said window whereby the diffractive optical projection element produces a patterned beam of light which forms a projected image;

an optical detection device located at a position at which the patterned beam of light is reconstructed to form the projected image;

a processor for processing and analysing signals from the optical detection device; and a document processing means for processing the security documents according to the signals from the optical detection device.

According to a fifth aspect of the invention, there is provided a method of processing or handling security articles comprising a method for inspection in accordance with the first aspect of the invention, wherein a signal is generated by the optical device when it detects the absence or poor quality of a diffractive optical projection element in a security article, and isolating or marking the security article.

In a further embodiment, a plurality of light sources may be provided for illuminating at least one diffractive optical projection element. Each of the light sources may cause a patterned beam to be diffracted at a slightly different point on the optical detection device, creating multiple signals on the same detector. By integrating these signals and sampling the signal over a period of time, it is possible to differentiate constructive diffraction produced by the diffractive optical projection element from a random or diffuse scattering of light, such as that caused by a scratch or a surface imperfection, or light transmitted through a standard diffraction grating or hologram. It is also envisaged that a moving light source which produces an incident light beam that scans across the diffractive optical projection element could be used to create multiple signals at the optical detector.

BRIEF DESCRIPTION OF THE DRAWINGS

Preferred embodiments of the present invention will now be described, by way of example only, with reference to the accompanying drawings, in which.

DETAILED DESCRIPTION OF THE INVENTION

Figure 1:
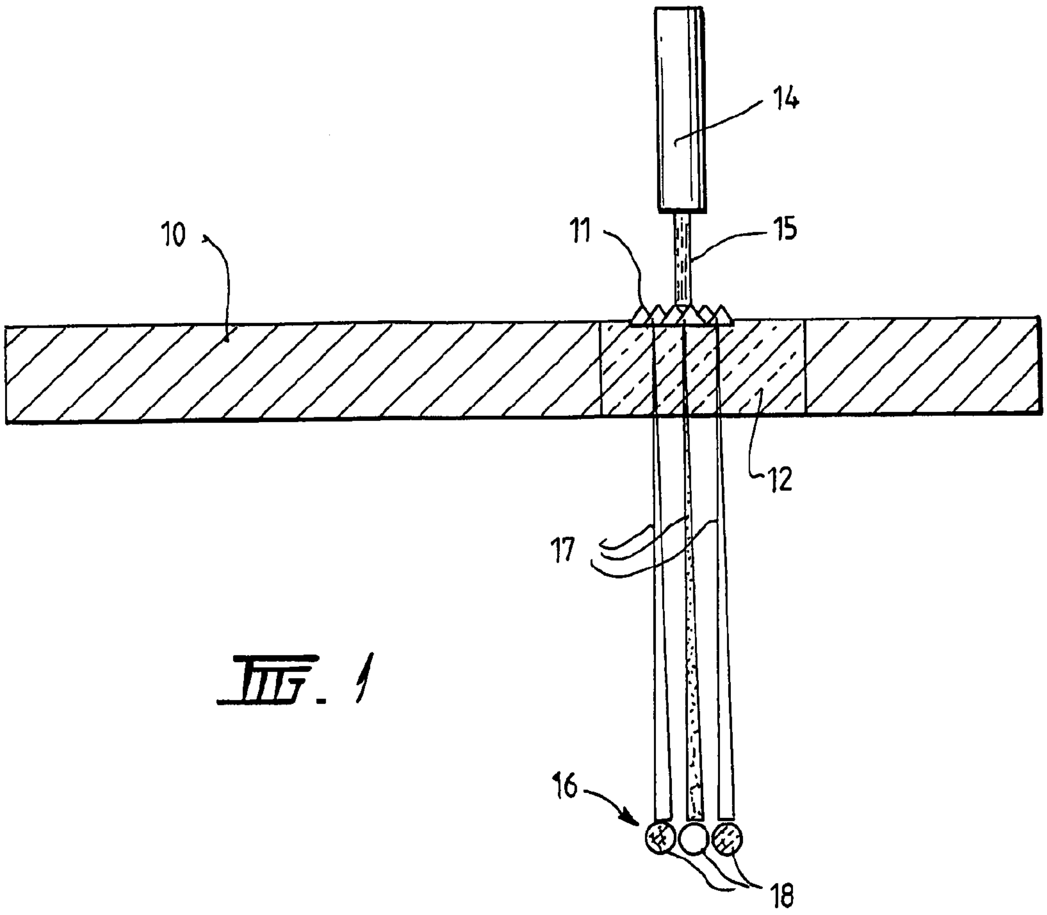
FIG. 1 is a schematic drawing of apparatus for inspecting a security document incorporating a diffractive optical projection element.

FIG. 1 shows apparatus for inspection of a security document 10 incorporating a diffractive optical projection element (DOE) 11 provided in a transparent portion or window 12 of the document 10. The apparatus comprises a point light source 14 which directs an incident beam of substantially collimated light 15 onto the DOE 11, and detection means in the form of an optical detection device 16.

In one preferred embodiment, the security document 10 may be formed from an at least partially transparent substrate having one or more opacifying layers or coatings applied to at least one face of the substrate. The transparent portion or window 12 of the security document 10 may be formed by applying the opacifying layers or coatings to the substrate in such a manner that the substrate 12 is substantially free of opacifying layers or coatings in the region of the transparent portion or window 12. The transparent substrate may be formed from a transparent polymeric material, such as polyethylene (PE), polypropylene (PP) or polyethylene terephthalate (PET). In the case of a banknote, the substrate is preferably formed from at least one biaxially oriented polymeric film. The substrate may comprise a single film of polymeric material. Alternatively, the substrate may comprise a laminate of two or more layers of transparent biaxially oriented polymeric film.

It will, however, be appreciated that the present invention is equally applicable to security documents formed from paper or other partially or fully opaque material. In this case, an aperture may be formed in the paper or other material and a patch of transparent polymeric material inserted into or applied over the aperture to form the transparent portion or window 12.

The opacifying layers may comprise one or more of a variety of opacifying inks which can be used in the printing of banknotes or other security documents. For example, the layers of opacifying ink may comprise pigmented coatings comprising a pigment, such as titanium dioxide, dispersed within a binder or carrier of cross-linkable polymeric material.

The diffractive optical projection element 11 acts to transform the incident light beam 15 from the point light source 14 as the beam passes through the at least partially transparent portion 12 of the security document (the window created through the security document) into a patterned beam 17 of selected design. The diffractive optical projection element is of the type which acts to generate the patterned beam 17 by diffraction of the light beam 10. One example of such a device is a diffractive optical projection element or diffuser made by Mems Optical, Inc. in accordance with WO 98/32590. Such devices are complicated surface micro relief structures similar to diffraction gratings. Whilst the optical transformation of the incident light beam 15 to the patterned beam 17 is based on the optical principle of diffraction, the mathematics of the structure of such devices is specifically designed in each case to produce a distinct optical transformation in order to produce a desired patterned image which is reconstructed at a particular point in space away from the security document 10, Each diffractive optical projection element 11 can be dependent on the wavelength of the light beam used.

The point light source 14 for producing the incident beam 15 may comprise an LED, a halogen light source, a laser or other light source for producing a beam of substantially collimated light which is directed on the DOE 11.

The optical detection device 16 is positioned at the particular point in space at which the patterned beam 17 forms the patterned image projected by the DOE 11.

The various points in space of the image projected by the DOE 11 are determined by the special focal coordinates created by a sinusoidal grating which constitutes the DOE 11 and the positions of the light source 14 and detector 16 relative to the DOE 11.

The presence of the patterned image projected by the DOE 11 is determined by the amplitude of the response of the detector 16 at particular points in space where the detector is located. For this purpose, the detector may comprise an array of photo-diodes 18, or a charge couple device (CCD) such as a line CCD or a matrix CCD.

Figure 2:
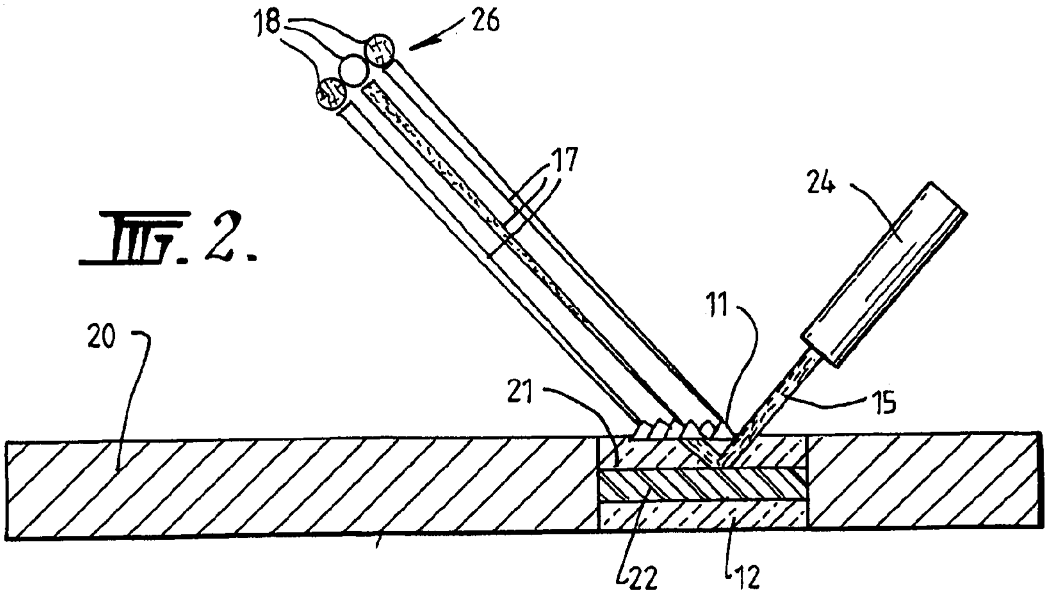
FIG. 2 is a schematic drawing of apparatus for inspecting a modified security document.

FIG. 2 shows a modified embodiment which is similar to FIG. 1 and corresponding reference numerals have been applied to corresponding parts. The security document 20 in FIG. 2 differs from that of FIG. 1 in that the transparent portion or window 12 incorporates a reflective surface 21 underneath the diffractive optical projection element (DOE) 11. The reflective surface may be provided by a metallic layer 22 provided within the window 12 or by a metallised coating applied to a surface of the transparent portion forming the window 12 before the DOE 11 is applied over the reflective surface 21.

The apparatus of FIG. 2 also differs from that of FIG. 1 insofar as the point light source 24 and the optical detector 26 are located on the same side of the security document 20. The light source 24 is arranged to direct a substantially collimated incident beam 15 onto the window 12 at an acute angle to the perpendicular to the surface of the security document 20 so that the incident beam 15 is reflected back from the reflective surface 21 of the metallic layer 22 onto the DOE 11. The reflected beam passes through the DOE 11 and is transformed by the DOE 11 into a patterned beam 17 in similar manner to the embodiment of FIG. 1.

The detector 26, which may also comprise an array of photo-diodes 18 or a line or matrix CCD, is disposed at a position relative to the security document 20 to receive the patterned beam 17 which also travels from the DOE 11 at an acute angle to the perpendicular to the surface of the security document 20 corresponding to the angle of the incident beam 16. Otherwise, the detector 26 functions in exactly the same manner as the detector of FIG. 1 by determining the amplitude of different parts of the reconstructed projected image formed by the patterned beam 17 at particular points in space where the photo-diodes 18 are located.

In an alternative embodiment similar to FIG. 2, the light source 24 is arranged to direct the substantially collimated incident beam at an acute angle onto the DOE 11 which transforms the beam into a patterned beam 17 that is reflected by the reflective surface 22 and projected onto the detector 26 located at the particular position in space where the projected image is reconstructed by the patterned beam 17. It is also possible that the DOE could be viewed in reflection without an underlying metallic surface using the reflectivity of the polymer surface.

Figure 3:
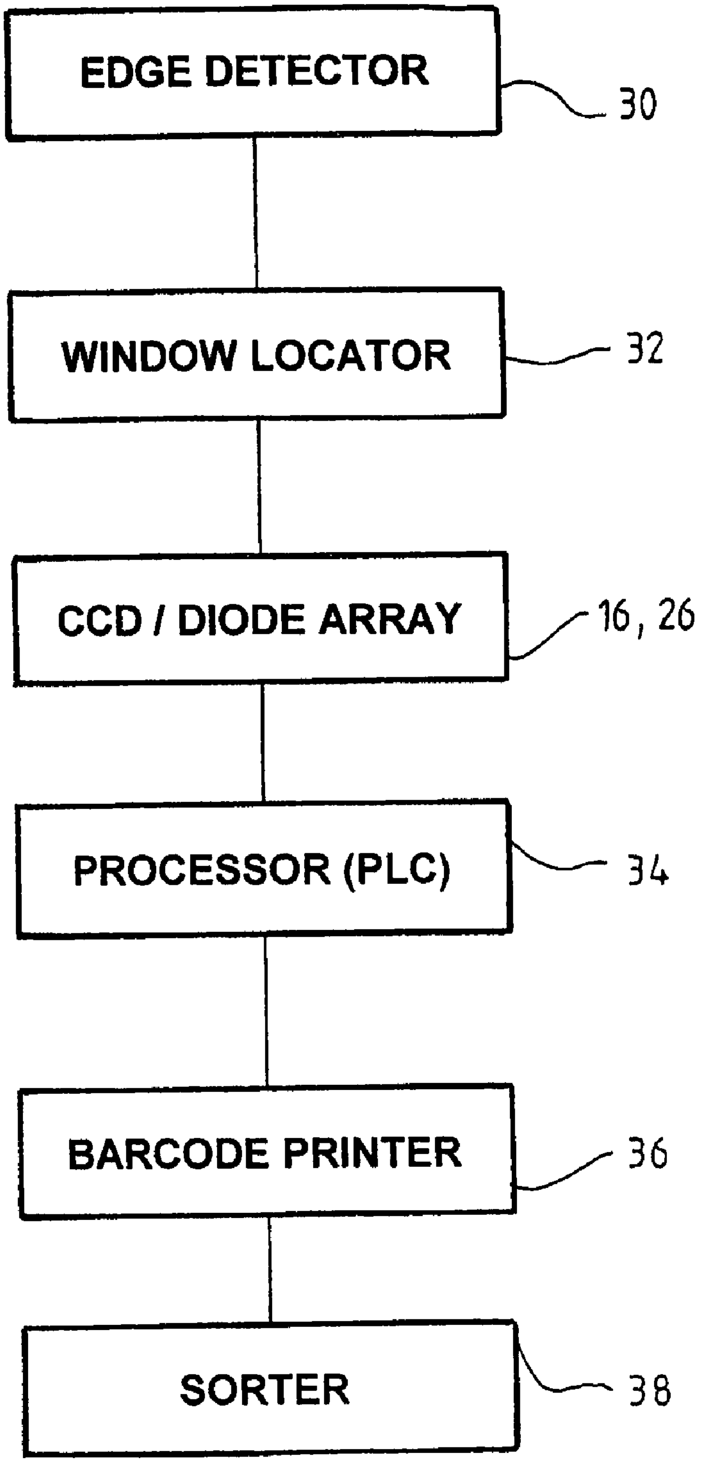
FIG. 3 is a block diagram of sorting equipment incorporating the inspection apparatus of FIG. 1 or FIG. 2.
Figure 4:
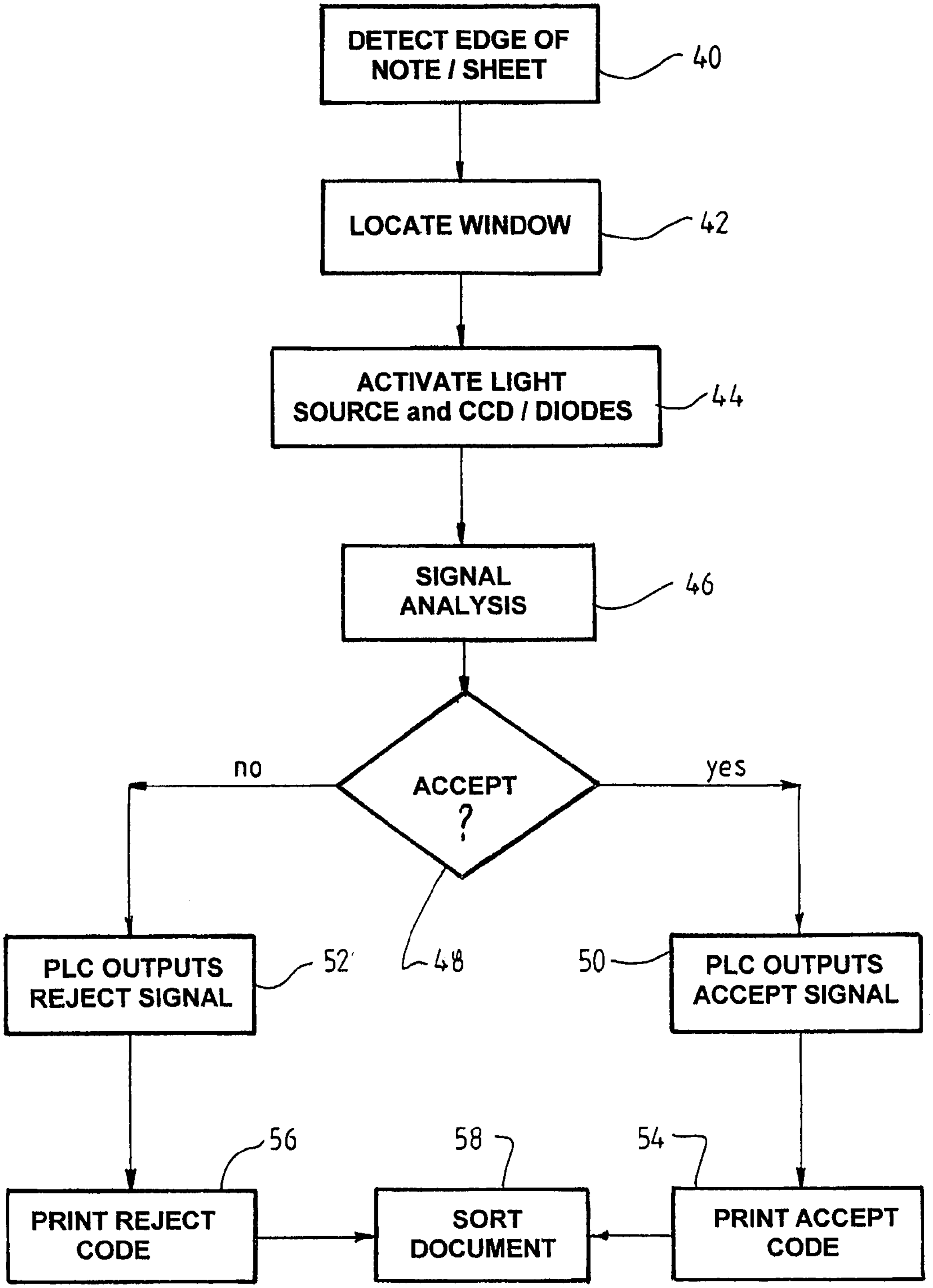
FIG. 4 is a schematic flow chart of a method of sorting documents using the equipment of FIG. 3.

FIGS. 3 and 4 illustrate sorting equipment and a method of sorting security documents utilizing the inspection apparatus of FIG. 1 or FIG. 2.

The sorting equipment of FIG. 3 comprises an edge detector 30 for detecting the presence of a security document, such as a banknote, or a sheet of banknotes, a window locator 32 for locating a window 12 in a security document incorporating a DOE 11, an optical detector 16, 26 in the form of a CCD or photo-diode array for inspecting a patterned beam 17 from the DOE 11, a processor 34 for processing and analysing signals from the optical detector 16, 26, a barcode printer 36 and a document sorter 38 for sorting the security documents according to the signals from the optical detector 16, 26.

The method of operation of the sorting equipment of FIG. 3 is illustrated by the flow chart of FIG. 4. When a security document, e.g. a banknote, or a sheet of banknotes enters the sorting equipment, the edge detector 30 detects the presence of a banknote, or a sheet of notes, by detecting the edge of the note or sheet (Step 40). When the window locator 32 locates a window in the note or sheet (Step 42), e.g. by means of a time gated output from the processor 34, the light source (14, 24) and the CCD or photodiodes of the optical detector 16, 26 of the inspection apparatus are activated (Step 44).

The optical detector 16, 26 then performs its inspection of the security document and produces output signals that are input to the processor 34 which analyses the signals (Step 46). The processor 34 may comprise a process logic controller (PLC) or a microprocessor, such as a PIC chip, and can not only determine whether a DOE 11 is present in the window of the document, but can also determine the quality of the DOE by its inspection of the projected image formed by the patterned beam 17 from the DOE.

From its signal analysis, the processor (PLC) 34 determines whether or not the banknote should be accepted or rejected (Step 48), and outputs either an accept signal (Step 50) or a reject signal (Step 52). The output signals from the processor 34 are input to the barcode printer 36 which prints either an accept code (Step 54) or a reject code (Step 56) on the banknote or sheet of banknotes, The banknote or sheet of banknotes are then fed to the sorter 38 which sorts the documents (Step 58) by sending those marked with an accept code (54) to a delivery stack and by sending those marked with a reject code (56) to a reject stack.

The method and apparatus of the present invention therefore provides an efficient way of automatically inspecting security articles, such as banknotes, which incorporate diffractive optical projection elements (DOEs) as high security devices.

The inspection method and apparatus may be used in a wide variety of equipment, such as printing equipment, note counting or sorting equipment or any other equipment used in the printing, handling or processing of security documents or other security articles.

It will be appreciated that various modifications and alterations may be made to the embodiments described above without departing from the cope and spirit of the present invention. For example, the inspection apparatus of FIGS. 1 or 2 may be used to inspect other types of security articles having either a DOE provided in a transparent portion or window or a DOE provided on a reflective surface of the security article, 20.

The invention claimed is:

1. Equipment for sorting, handling, counting or otherwise processing security documents, the equipment including:

a detector for detecting the presence of a security document;

a window locator for locating a window in the security document incorporating a diffractive optical projection element;

a light source for directing a beam of light through said diffractive optical projection element in said window whereby the diffractive optical projection element produces a patterned beam of light which forms a projected image;

an optical detection device located at a position at which the patterned beam of light is reconstructed to form the projected image;

a processor for processing and analysing signals from the optical detection device; and a document processing means for processing the security documents according to the signals from the optical detection device.

2. Equipment according to claim 1 wherein the processor generates a rejection signal when the absence or poor quality of a diffractive optical projection element is detected by the optical detection device.

3. Equipment according to claim 1 wherein the processor comprises a process logic controller (PLC) or a microprocessor to determine the presence of a diffractive optical projection element in the window.

4. Equipment according to claim 3 wherein the PLC or the microprocessor determines the quality of the diffractive optical projection element by inspection of the projected image formed by the patterned beam, and the PLC or the microprocessor outputs an accept or reject signal based on the quality of the diffractive optical projection element.

5. Equipment according to claim 1 further including a barcode printer, and, wherein the barcode printer prints either an accept or reject code on the security document in accordance with the output of the processor.

6. Equipment according to claim 5 wherein the document processing means processes the security documents in accordance with the code printed by the barcode printer.

7. Equipment according to claim 1 wherein the detector for detecting the presence of a security document is an edge detector which detects the edge of a security document.

8. Equipment according to claim 1 wherein the document processing means includes any one or more of the following:

a document sorter;

a counter for counting security documents; or a document printer.

* * * * *

UNITED STATES PATENT AND TRADEMARK OFFICE

CERTIFICATE OF CORRECTION

PATENT NO. : 7,652,757 B2
APPLICATION NO. : 10/585506
DATED : January 26, 2010
INVENTOR(S) : Power et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 339 days.

Signed and Sealed this

Twenty-third Day of November, 2010

David J. Kappos

*Director of the United States Patent and Trademark Office*